United States Patent [19]

Gronau

[11] 4,413,210
[45] Nov. 1, 1983

[54] AUTOMATIC GUIDING DEVICE FOR AN INDOOR GOODS TRANSPORTER

[75] Inventor: Jürgen Gronau, Bergisch Gladbach, Fed. Rep. of Germany

[73] Assignee: Köttgen GmbH & Co. Kommanditgesellschaft, Bergisch Gladbach, Fed. Rep. of Germany

[21] Appl. No.: 218,411

[22] Filed: Dec. 19, 1980

[30] Foreign Application Priority Data

Jan. 15, 1980 [DE] Fed. Rep. of Germany ....... 3001146

[51] Int. Cl.³ .............................................. H04Q 7/02
[52] U.S. Cl. ...................................... 318/16; 180/169
[58] Field of Search ........ 73/505; 343/12 R, 112 CA; 250/200, 201, 202; 46/117; 318/16; 340/52 H; 180/167–169, 79.1, 131, 142

[56] References Cited

U.S. PATENT DOCUMENTS

| | | | |
|---|---|---|---|
| 2,457,393 | 12/1948 | Muffly | 343/112 CA |
| 2,513,279 | 7/1950 | Bradley | 343/112 CA |
| 2,804,160 | 8/1957 | Rashid | 343/112 CA |
| 2,952,842 | 9/1960 | Bourdon | 180/131 X |
| 3,749,197 | 7/1973 | Deutsch | 340/52 H X |
| 3,856,104 | 12/1974 | Ohba | 180/167 |
| 4,049,961 | 9/1977 | Marcy | 180/169 X |
| 4,069,888 | 1/1978 | Wolters et al. | 180/169 |

Primary Examiner—Ulysses Weldon
Attorney, Agent, or Firm—Spensely, Horn, Jubas & Lubitz

[57] ABSTRACT

An automatic guiding device for an indoor goods transporter comprising a path detector being responsive to stationary guiding facilities and controlling a steering means of the vehicle.

9 Claims, 3 Drawing Figures

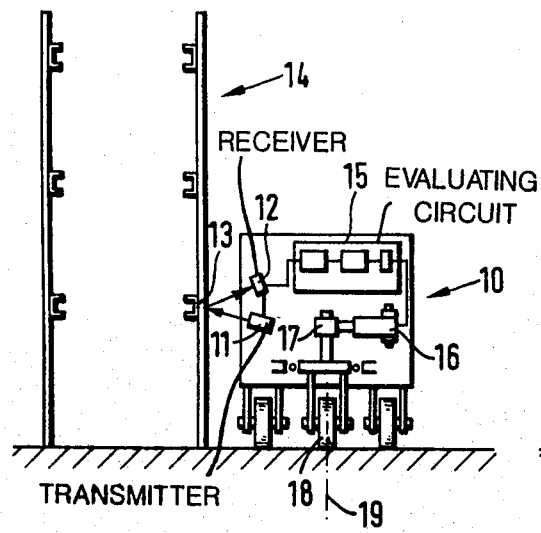
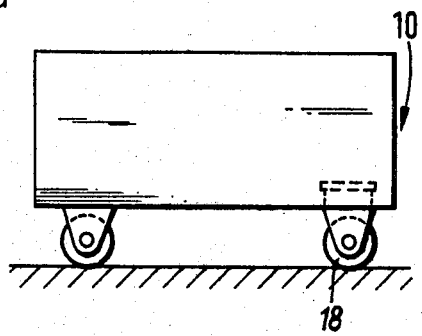
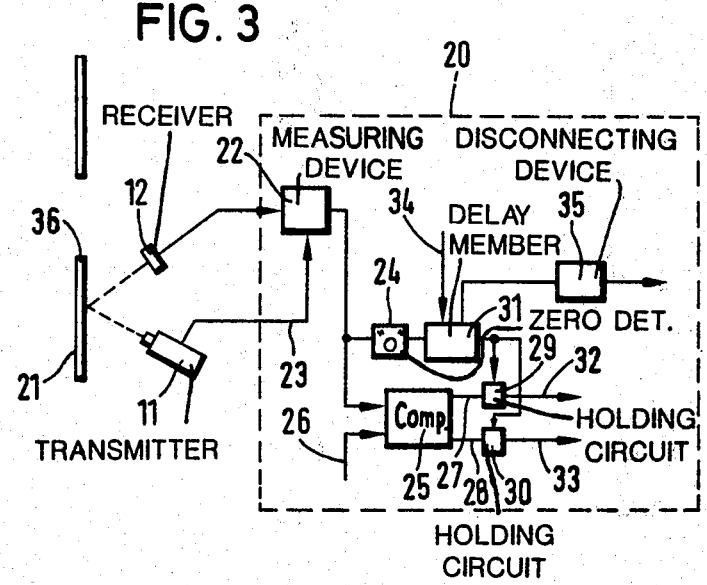

AUTOMATIC GUIDING DEVICE FOR AN INDOOR GOODS TRANSPORTER

The invention relates to an automatic guiding device for an indoor goods transporter comprising a path detector being responsive to stationary guiding facilities and controlling a steering means of the vehicle.

It has been known to guide indoor goods transporters in the passages between the racks for loading and de-loading storages in that steel rails are provided at both sides of the rack passage for the lateral guide rolls of the transporter to roll along them. The indoor goods transporter having a locked steering is maintained on its path by the steel rails and it cannot collide directly with a rack. In other words, the driver need not steer the transporter between the racks but it is positively guided automatically along the course taken. Such a guide system calls for stable and expensive steel rails at both sides of the road. The guide rails are not only involved and expensive, but, because of their arrangement above the bottom, they form a considerable obstacle.

In addition, there have been known guide line systems in which a wire installed underground is fed with a high frequency current. The indoor goods transporters are provided with antennae which scan the magnetic field formed about the wire and which, via a control device and a steering motor act on the steering. With respect to the frequency generator, the installation of the lines and the ground works a relatively high expenditure is required to perform the guiding duty.

It is the object of the invention to provide an automatic guiding device of the type mentioned at the outset hereof by doing away with the stationary electric guide equipments so that it can be used also in already existing facilities such as stores etc., without the need of any structural alterations.

To solve the problem, it is provided according to the invention that the path detector is a contactlessly operating distance measuring device having a measuring direction oriented laterally of the indoor goods transporter.

The distance measuring device determines the distance of the transporter from any construction present at the sides of the driving path. By this means, the indoor goods transporter is automatically kept on its way in that the distance to the constructions limiting the driving path is measured continuously or at intervals to utilize it as a steering correction. Thus, the indoor goods transporter always maintains the same distance to a lateral surface which need not necessarily extend straightly, but which may have arches in the form of curves. A vehicle equipped according to the invention can run along a wall at a constant distance parallel thereto. During travels between the racks, the existing rack traverses may serve as measuring surfaces. In other words, the invention makes use of the existing situation and the natural limits of the path to automatically steer the indoor goods transporter.

The distance measuring device may comprise e.g. an ultrasonic transmitter and-receiver. Distance measuring is performed by measuring the transit time of the ultrasonic waves from the transmitter to the receiver. Alternatively, it is also possible to measure the distance by means of electromagnetic waves and to determine e.g. the phase difference between transmitter and receiver. The wave length of the used electromagnetic waves is dictated by the prevailing circumstances. The more accurate the measurement to be made the shorter the waves used, as a rule. As a transmitter for electromagnetic waves, a laser may be for instance used.

To avoid a change of direction or a stop of the indoor goods transporter in case of an interruption of the wall or surface from which the distance is measured, it is provided in an advantageous development of the invention to include a locking device which retains the steering device in the position set at last when the measured distance values are outside a defined measuring range. In a sudden change of the distance values, the device can draw the conclusion that the surface used as a guide surface, is interrupted. As a result, the course is not changed immediately, but the last course taken is retained. If, upon a short continuation of the travel in the course, an existing guide surface is detected again, the adjusted distance to the guide surface is reestablished. The vehicle may thus also run along walls which contain interruptions in the form of doors, and the guide function is not impaired for all that.

The same principle is also applicable to a travel between racks which have no horizontal guide surfaces, but only vertical stacking frames. The path detector, when passing by a frame, is responsive thereto and the distance of the vehicle to the frame is adjusted accordingly. Upon the continuation of the travel, when the frame is out of the reach of the measuring point of the distance measuring device, the locking device is operating to retain the steering until the next frame will be within the measuring range. To avoid collisions with other obstacles, the usual feelers and measuring devices may be present, of course, which disconnect the drive of the vehicle when it approaches inadmissibly another obstacle.

In an advantageous embodiment of the invention, the locking device is connected to a pulse source by the pulses of which it is maintained operative. The locking device may contain a counter and, upon receipt of a predetermined pulse number it will be put out of operation. The pulse source preferably emits pulses which are dependent upon the speed or upon the travelled course. By this means, it is ensured that in case of higher travel speeds the path made with locked steering device is not substantially greater than with low travel speeds.

For the travel in narrow passages beetweeen the racks, it is possible to provide two path detectors which are directed to opposite sides of the indoor goods transporter. The path detectors may be so coordinated or connected to the control device that the distances of the indoor goods transporter to the surfaces at both sides are equal, so that the vehicle is maintained exactly in the center of the passage. If necessary, different distances from both surfaces can be also selected.

With reference to the Figures an embodiment of the invention is explained more closely hereinafter.

FIG. 1 is a schematic illustration of an indoor goods transporter travelling along a rack.

FIG. 2 is a side view of the indoor goods transporter according to claim 1 and

FIG. 3 is a schematic block wiring diagram of a control device suitable to bridge gaps in the scanned surface.

In FIGS. 1 and 2 the indoor goods transporter 10 illustrated schematically is fitted with a distance measuring device comprising a sonic transmitter 11 and a sonic receiver 12. The transmitter 11 emits ultrasonic pulses laterally of the indoor goods transporter 10 which are reflected by the traverse 13 of the rack 14 and, delayed by the transit time of the sound path are getting to the receiver 12. In measuring the transit time between emitting and receiving of the ultrasonic pulses, the distance of the transmitter and receiver devices 11, 12 from the rack 14 is detected. The transit time determined at the transmitter-receiver device 11, 12 is transmitted to an evaluating circuit 15, which determines the deviations from a desired value to actuate the steering drive 16 subject to said deviations. The steering drive 16 is an electric motor acting via a worm gear 17 on the steerable wheel 18 of the tricycle indoor goods transporter 10 and the wheel 18 is swivelled about the vertical steering axle 19 so that the wheel 18 performs steering movements. By this means, the indoor goods transporter 10 is kept at a constant distance from the rack traverse 13.

In the embodiment of FIGS. 1 and 2, the rack traverse is the reference surface at which the waves of the distance measuring device are reflected. The reference surface used may be also for instance a brickwork or concrete wall.

If there is no continuous rack traverse 13, or if the wall serving as a reference surface contains interruptions, use is made of the evaluating device 20 illustrated in FIG. 3. It is also connected to a transmitter and receiver device 11, 12 operating in the manner described above.

In other words, the transmitter 11 emits pulses which are reflected by the reference surface 21 and supplied to the receiver 12 with a transit time delay. When a transmitter pulse is emitted, a pulse is supplied via a line 23 to a measuring device 22, which also receives the output pulse of the receiver 12 and determines the time difference between the transmitter pulse and the receiver pulse. Moreover, the measuring device 22 is so designed that only transit times which are within a predetermined time window are evaluated. By the time window the distance range is defined within which measurements capable of being evaluated can be made. If transit times are outside the time window, an "O"-signal is generated at the output of the measuring device 22. However, if the measured transit time is within the range of the time window, the signal generated at the output of the measuring device 22 represents the measured transit time.

The output signal of the measuring device 22 is supplied to a zero detector 24 and to a comparator 25. The zero detector 24 determines whether the signal supplied to it is "0" or whether it represents a value that can be evaluated. Via a second input line 26, a reference voltage is supplied to the comparator 25 and corresponds to the desired distance of the transmitter—and receiver device 11, 12 from the reference surface 21. The comparator 25 has two output lines 27 and 28. A control signal is generated at the output line 27 if the output signal of the measuring device 22 is greater than the reference voltage at line 26. At the output line 28, a signal is generated if the output signal of the measuring device 22 is inferior to the reference signal at line 26. The output line 27 is connected to a holding circuit 29, and the output line 28 is connected to a holding circuit 30. The output signal of the zero detector 24 controls the holding circuits 29 and 30 via a delay member 31 so that with the occurrence of a "O"-signal at the output of the measuring device 22, the signals of the output lines 27 and 28 are retained by the holding circuits 29 and 30. Thus, if the reference surface 21 is interrupted so that a signal at the output of the zero detector 24 appears and states that no distance that can be evaluated was detected, the distance determined at last or the difference of the distance from the adjusted desired value is retained by one of the holding circuits 29, 30, and it is further applied to the corresponding steering-control line 32, 33. Upon a certain time, the delay member 31 disconnects the transmission of the output signal of the zero detector 24 to the holding circuits 29 and 30. The time is so determined by a pulse clock at line 34 that the time member 31 can transmit the output signal of the zero detector 24 via a specific number of pulses, to subsequently decrease to zero. The line 34 is connected to a pulse source which is coupled with the travelling mechanism of the indoor goods transporter 10. The pulse source consists for instance of a slotted plate rotating synchroneously to the wheels of the indoor goods transporter and the slots of which excite a pulse generator. During a quick travel of the indoor goods transporter 10, the repetition frequency of the clock pulses at line 34 is relatively high, and with a slow travel, the repetition frequency of the pulses at line 34 is relatively low. The time interval in which the time member 31 transmits the output signal of the zero detector 24 to the holding circuits 29 and 30 is, therefore, reciprocally proportional to the travelling speed.

To ensure that the drive of the indoor goods transporter 10 is disconnected when the timing member 31 has run down, the timing member 31 is connected to a disconnecting device 35. When the timing member 31 has terminated its full operation or if the zero detector 24 has generated past a predetermined number of pulses to line 34 a "1"-signal, the disconnecting device 35 will be responsive to cause disconnection of the travelling drive of the indoor goods transporter and its immediate braking. As a result, the vehicle stops.

If the reference surface 21, on the other hand, has an interruption 36 whose length is below the predetermined maximum value, the operation of the holding circuits 29 and 30 bridges the corresponding distance of the road. The vehicle maintains the steering movement adjusted at last until measuring values which can be evaluated again appear at the output of the measuring device 22.

By this means, it is possible to evaluate with racks, without a continuous guide rail, only the pillars or stacking frames as references surfaces which are provided at specific distances. In place of a measuring device, operating with sound or ultrasound, a radar measuring system or a laser measuring system may be used.

What is claimed is:

1. An automatic guiding device for guiding a travelling vehicle in a path parallel to a stationary lateral surface at a predetermined distance from the lateral surface, the guiding device comprising:
   transmitter means for transmitting a propagating wave signal to the lateral surface;
   receiver means for receiving the wave signal reflected from the lateral surface;
   measuring means responsive to the transmitter means and the receiver means, for determining the transit time of the wave signal from the transmitter means to the receiver means, and providing a signal indicative of the measured lateral distance from the vehicle to the lateral surface and for providing an outside range signal when the measured lateral distance is outside a predetermined range;
   comparison means for comparing the measured lateral distance signal with a predetermined reference distance signal;

steering means responsive to the comparison means, for steering the vehicle so that the vehicle maintains a predetermined distance from the lateral surface; and holding means responsive to the measuring means, for holding the steering means in response to the outside range signal so that the vehicle continues on the course set immediately prior to the measured lateral distance falling outside the predetermined range.

2. A guiding device according to claim 1 wherein the transmitter means includes a sound transmitter and the receiver means includes a sound receiver.

3. A guiding device according to claim 1 wherein the transmitter means includes an electromagnetic wave transmitter and the receiver means includes an electromagnetic wave receiver.

4. A guiding device according to claim 3 wherein the transmitter means includes a laser.

5. The guiding device of claim 1 wherein the vehicle has drive means for driving the vehicle, the guiding device further comprising timing means responsive to the measuring means, for timing an interval of time upon the initiation of the outside range signal from the measuring means, and disconnecting means, cooperating with said timing means, for disconnecting the drive means upon the expiration of the timed interval if the outside range signal from the measuring means is still present.

6. An automatic guiding device for guiding a travelling vehicle in a path parallel to intermittent stationary lateral surfaces at a predetermined distance from the lateral surfaces, the guiding device comprising:

transmitter means for transmitting a propagating wave signal to a lateral surface;

receiver means for receiving the wave signal reflected from the lateral surface;

measuring means responsive to the transmitter means and the receiver means, for determining the transit time of the wave signal from the transmitter means to the receiver means, and providing a signal indicative of the measured lateral distance from the vehicle to the lateral surface and for providing an outside range signal when the measured lateral distance is outside a predetermined range;

comparison means for comparing the measured lateral distance signal with a predetermined reference distance signal;

steering means responsive to the comparison means, for steering the vehicle to set a course such that the vehicle maintains a predetermined distance from the lateral surfaces; and holding means responsive to the measuring means, for controlling the steering means in accordance with the last measured lateral distance signal within the predetermined range so that the vehicle holds the last course set if a discontinuity outside the predetermined range is encountered.

7. In a transport vehicle having steering means for steering the vehicle and a guiding device for automatically guiding the vehicle by measuring the lateral distance from the vehicle to a stationary lateral surface and controlling the steering means of the vehicle in accordance with the measured distance, the improvement comprising:

means for detecting when the measured lateral distance exceeds a predetermined maximum; and means responsive to the detecting means for controlling the steering means to maintain the steering course set immediately prior to the measured lateral distance exceeding the predetermined maximum and for releasing the steering means when the measured lateral distance is below the predetermined maximum.

8. The vehicle of claim 7 further comprising timing means for timing the duration of time during which the measured lateral distance exceeds the predetermined maximum; and stopping means, cooperating with said timing means, for stopping the vehicle if the measured lateral distance remains in excess of the predetermined maximum upon the expiration of a period of time.

9. The vehicle of claim 8 wherein the duration of the period of time timed by the timing means is inversely proportional to the speed of the vehicle.

* * * * *